United States Patent [19]

Bose

[11] 3,919,268
[45] Nov. 11, 1975

[54] PROCESS FOR THE PREPARATION OF 3-AXIAL HYDROXY STEROIDS

[76] Inventor: Ajay K. Bose, 248 Morris Avenue, Mountain Lakes, N.J. 07046

[22] Filed: July 17, 1972

[21] Appl. No.: 272,231

[52] U.S. Cl. ........ 260/397.4; 260/397.1; 260/397.2; 260/397.45; 260/397.47; 260/397.5; 424/243
[51] Int. Cl.$^2$............................................. C07J 9/00
[58] Field of Search.................... 260/397.4, 397.2; /Machine Searched Steroids

[56] References Cited
UNITED STATES PATENTS

| | | | |
|---|---|---|---|
| 3,647,829 | 3/1972 | Kruger............................ | 260/397.4 |
| 3,825,565 | 7/1974 | Gregory et al.................. | 260/397.4 |

OTHER PUBLICATIONS

Mitsunobu et al., Bull. Chem. Soc. Japan vol. 44 pp. 3428–3430 (1971).

*Primary Examiner*—Elbert L. Roberts
*Attorney, Agent, or Firm*—Behr & Woodbridge

[57] ABSTRACT

It has been found that steroids having hydroxy groups in the equatorial orientation may be converted into corresponding steroids having said hydroxy group in the corresponding axial position.

In particular, 3β-hydroxy A/B trans steroids may be converted into the corresponding 3α-hydroxy steroids. In the process of the present invention a 3β-hydroxy steroid is reacted with triphenyl phosphine in the presence of dialkyl azodicarboxylate and a carboxylic acid to yield the corresponding 3α-carboxylic acid ester which may, if desired, be saponified to the 3α-hydroxy A/B trans steroid. The method provides a simple route to the formation of important physiologically active steroids using the more readily available 3β-hydroxy isomer. Included among these compounds is androsterone.

10 Claims, No Drawings

PROCESS FOR THE PREPARATION OF 3-AXIAL HYDROXY STEROIDS

FIELD OF THE INVENTION

Conversion of steroid compounds having equatorial hydroxy groups to the corresponding steroid having axial hydroxy groups.

DESCRIPTION OF THE PRIOR ART

It is well known that the physiological activity of steroids is often highly dependent upon the stereochemical orientation of a single group in the molecule. It is also known that the most active compound is often not the one thermodynamically preferred. Thus, compounds having the critical group in the thermodynamically favored equatorial position are often more readily available, than the sometimes more biologically active axial form. Methods are known to the art for the conversion of steroids having an equatorial hydroxy group to the corresponding steroids having an axial hydroxyl group. The classical method for such conversion is reported by Chang and Blickenstaff (J. Amer. Chem. Soc.; 80, 2906 (1958)). This method requires the conversion of the hydroxy group in question into the corresponding tosylate which is then transformed into the corresponding formate by reaction with dimethylformamide during which transformation inversion occurs. While the yields in this prior art mode are fairly acceptable (Circa. 73%) the reaction time of approximately 45 hours, presents substantial problems where these conversions are to be carried out on an industrial scale.

It has been reported (Mitsunobu and Eguchi, Bull. Chem. Soc. Japan., 44, 3428 (1971)) that various acids and acidic compounds such as benzoic acid will react with secondary alcohols in the presence of triphenyl phosphine and diethyl azodicarboxylate to yield esters with stereochemical inversion. However, the teaching of Mitsunobu and Eguchi would appear to indicate that inversion occurs regardless of the initial stereochemical orientation of the starting alcohol.

SUMMARY OF THE INVENTION

Steroids having hydroxyl groups in the equatorial position may be converted into the corresponding steroids having said hydroxyl group in the axial position. In the process of this invention the steroid in question, for example, a 3$\beta$-hydroxy A/B trans steroid is reacted with triphenyl phosphine and diethyl azodicarboxylate in the presence of a carboxylic acid to form the corresponding 3$\alpha$-steroid ester. It is our interesting and surprising finding that this reaction is a one-way reaction. In our hands, the corresponding 3$\alpha$-hydroxy A/B trans steroid could not be converted to the corresponding 3$\beta$-steroid ester.

The ester is then converted to the corresponding alcohol by saponification in the usual manner. Where it is desired to carry out the reaction of the present invention with compounds having ester groups in other portions of the molecule and it is desired to preserve them in the final product, the acid utilized in the reaction of the present invention is trifluoroacetic acid, which forms esters which are readily hydrolyzed under conditions which would leave other esters such as acetates, benzoates and the like intact.

It is a central feature of the present invention that the process may be carried out in the presence of sterically hindered hydroxyl groups which will not be affected by it. For example, 1-, 7-, 12-, and 17-hydroxy groups.

It should be noted, however, that where the ring juncture between the A and B rings of the steroid is A/B trans and where a $\Delta^5$ double bond is present, the designation of the 3-equatorial hydroxy group is 3$\beta$, however, where the said ring juncture is A/B cis, then the 3-equatorial hydroxy group is designated as 3$\alpha$.

DESCRIPTION OF THE PREFERRED EMBODIMENTS

In the process of the present invention there is used as starting material a steroid having a secondary hydroxyl group attached to one of the rings of the steroid nucleus. The orientation of this hydroxyl group shall be equatorial. Its location on the nucleus is not critical, provided that the position is not sterically hindered. Thus, the hydroxyl group may be in the 2, 3, 11, 15 and 16 positions. Whether the orientation of these hydroxyl groups is designated as alpha or beta will be determined by the stereochemical orientation of the particular ring to which said hydroxyl is attached.

The hydroxy steroid having a hydroxyl in the equatorial orientation, is then taken up in a mixture of triphenyl phosphine, diloweralkyl, suitably dimethyl, diethyl or dipropyl azodicarboxylate, and an organic acid, suitably a carboxylic acid or a phenol. There may be utilized an alkyl, haloalkyl, polyhaloalkyl, aryl, alkaryl or aralkyl acid. Especially suitable, though by no means limited thereto, are acids wherein the alkyl moiety contains 1–5 carbon atoms and the aryl moiety is phenyl such as formic acid, acetic acid, propionic acid, benzoic acid, toluic acids, chloroacetic acid, trifluoroacetic acid, phenylacetic acid, phenol and substituted phenols such as nitro, halo and alkyl substituted phenols. Where it is desired to produce a final product having an ester grouping attached to the inverted position, the acid corresponding to that ester may be utilized. In the case of phenols, the compounds produced are of course phenyl ethers rather than esters. It is preferred to carry out the reaction in a solvent. Non-hydroxylic solvents such as ether or tetrahydrofuran are preferred. The reaction may be carried out at between about 0°C to about 50°C, preferably however the reaction is carried out at room temperature. In one modification of the reaction, the steroid, triphenyl phosphine, acid and solvent are mixed and the dialkyl, suitably diethyl azodicarboxylate added thereto, suitably in a portion of the solvent utilized. However, no particular preference is to be attached to this mode of proceeding.

It is important to utilize dry reagents and to exclude moisture from the reaction vessel by methods well known in the art in order to prevent sice reactions involving the triphenyl phosphine. The reaction is carried out utilizing one (1) mole of reagent (triphenyl phosphine, acid, and diethyl azodicarboxylate) per mole of monohydroxy steroid. Thus where for example, the steroid contains more than one hydroxyl group or keto group, irrespective of whether said hydroxyl group will be subject to stereochemical inversion or not, it is necessary to add 1 mole of triphenyl phosphine for each additional hydroxy or keto group per mole of steroid.

Provided the foregoing minimal ratios are satisfied excess quantities of reagents may be used. However consideration should be given to the inconvenience of removing unreacted triphenyl phosphine from the reaction mixture.

The reactants are agitated, suitably at room temperature for from about 8 to about 18 hours, the solvent removed, suitably under reduced pressure, and the residue purified. It is especially preferred to purify by column chromatography, using, for example, a Florisil column.

Where it is desired to maintain a previously located ester group on the steroid, the acid of choice is trifluoroacetic acid.

Similarly where it is desired to form a phenyl ether, in place of a carboxylic acid there is used, depending on the desired end-product, a phenol or substituted phenol for example, phenol itself, an alkyl phenol, such as cresol, an alkoxy phenol such as methoxy phenol or a halo phenol such as p-bromo phenol.

Where the ultimate product is desired to be the corresponding axial hydroxy steroid, the ester prepared in the foregoing step is subjected to hydrolysis in the usual manner. For example, the ester is taken up in aqueous alkanol, suitably aqueous methanol, and heated under reflux for from about 1 to about 20 hours with a strong base, for example an alkali metal hydroxide or alkoxide, such as sodium or potassium hydroxide, methoxide, or ethoxide or the like, using from about 1.1 to about 2 moles of alkali for each ester moiety per mole of steroid.

Where a phenol has been used in the inversion reaction, cleavage of the ether is achieved by methods well known in the art, for example by treatment with boron trichloride or boron tribromide.

Where it is desired to maintain ester groups upon the portion of the steroid other than the hydroxy moiety subjected to inversion, and where therefore the corresponding trifluoroacetate has been prepared, the trifluoroacetyl steroid is taken up in aqueous alkanol, suitably aqueous methanol (preferably one part of water in 10 parts of methanol), agitated at room temperature for from about 5 to about 15, suitably about 10 hours, in the presence of an excess of mild inorganic base suitably an alkali metal carbonate, and the product removed from the reaction mixture by extraction, suitably with methylene chloride or the like, which is then worked up in the usual manner.

It is our surprising discovery that the process of the present invention is stereo specific from unhindered to hindered orientations of a hydroxyl group only where, as in the case of steroids, the conformation of the asymmetric center is stereochemically locked with respect to the rest of the molecule. Thus, for example, where a mixture of 4-cis- and 4-trans-t-butylcyclohexanol, which are conformationally mobile, was subjected to the reaction of the present invention utilizing formic acid as the acid, there was obtained a mixture in the same proportions, of the corresponding formates. On the other hand, mixtures of 3β-cholestanol and 3α-cholestanol yielded a mixture of 3α-hydroxy and 3α-formyl steroids, and 3α-cholestanol itself was unchanged when subjected to the process of the present invention. It has further been found that the presence of a double bond at the 5 position of the steroid nucleus does not appear to affect the progress of the present invention. Thus, cholesterol is readily converted into the corresponding 3α-benzoate. Similarly, it has been found that 3β, 16α-dihydroxy-Δ⁵-androstene is converted, in a reaction in accordance with the process of the present invention, utilizing benzoic acid, to the corresponding 3α, 16β-dibenzoyloxy-Δ⁵-androstene.

Utilizing the process of the present invention the readily obtainable 3β-hydroxy-5α-pregnane-11,20-dione, and 21-acetoxy-3β-hydroxy-5α-pregnane-20-dione, are converted into the corresponding 3α-hydroxy analogs of said starting steroids which are components of anesthetic agent, CT-1341 (D. Campbell, et al, Brit. J. Anaesth., 43, 14 (1971)). The first component may be prepared using any of the acids listed as suitable in the process of the present invention, however, the second component having a 21-acetoxy group, is, suitably, reacted with trifluoroacetic acid, in order to preserve the 21-acetoxy moiety.

The currently used methods of the preparation of 3-hydroxy steroids generally lead to a mixture of 3β- and 3α-hydroxy derivatives. Subjecting this mixture to the process of the present invention, will yield, in the first instance, a mixture of the axial 3-ester and hydroxy steroids which may then, upon saponification, yield the pure axial 3-hydroxy compound which, in the case of A/B trans steroids would have the 3α-orientation, and in the case of A/B cis steroids, the 3β-orientation is obtained. For example, methyl cholate was converted to methyl 3β-formyl-7α,12α-dihydroxy cholanate.

Among the physiologically active 3α-hydroxy steroids which may be prepared from the corresponding 3β-isomers by the method of the present invention may be listed:

1α-methyl androstane-3α,17β-diol
3α-hydroxy-5α-androstan-17-one
16,16-difluoroandrostane-3α,17β-diol
16,16-difluoroandrostane-3α-ol-17-one
16,16-difluoro-17α-methylandrostane-3α,17β-diol
16,16-difluoro-17α-ethinylandrostane-3α,17β-diol
5α-androstane-3α,17β-diol-17-(1'-ethoxy-1'-methyl)-ethyl ether
5α-androstane-3α,17β-diol-17-(cyclopent-1'-aryl)-ether
20-hydroxymethyl-5β-pregnane-3α,11β,21-triol Compounds which may be used as starting materials for the preparation of these 3α-steroids may be included in the general formula

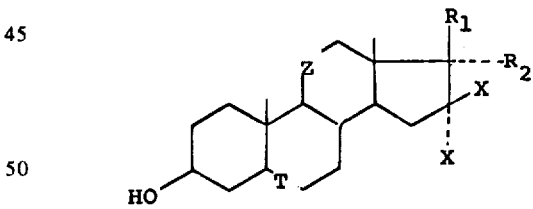

wherein

T is a carbon-carbon single bond or carbon-carbon double bond, provided that where T is a carbon-carbon single bond, the hydrogen at 5 is 5α, Z is =CH₂ or >C = O X is fluoroine, chlorine or bromine R₁ is hydroxy, alkanoyl, R₃O-CH₂·C=O where R₃ is alkanoyl, aryl, aralkanoyl alkaroyl or hydroxy, lower alkyl, lower alkynyl, cyclolower alkenyloxy, (lower alkoxy lower alkyl) lower alkoxy, (hydroxy loweralkyl) hydroxy loweralkyl, acetonidodihydroxy lower alkyl.

R₂ is hydrogen, and R₂ and R₁ when taken together are = O.

EXAMPLE I

Formation of 3α-Cholestanol from 3β-Cholestanol

Equimolar quantities of 3β-cholestanol (1.94 g.), benzoic acid (0.61 g), triphenyl phosphine (1.31 g.) and diethyl azodicarboxylate (0.87 g.) were added to 60 ml. of dry tetrahydrofuran. The reaction mixture was protected from moisture with a guard tube (calcium chloride) and stirred overnight. The solvent was then removed under reduced pressure and the semi-solid residue was dissolved in boiling methanol-ethyl acetate mixture. Upon cooling slowly 3β-cholestanol benzoate crystallized out, 1.7 g. (70%),mp 98°–100°, with satisfactory infrared and NMR spectra.

Using the same reaction conditions on 3α-cholestanol, only unchanged starting material was recovered.

The thus obtained 3α-cholestanol benzoate (400 mg.) was taken up in aqueous methanol (1:10) containing potassium hydroxide (200 mg.). The mixture was heated under reflux for 15 hours, cooled, acidified with dilute aqueous hydrochloric acid, extracted with methylene chloride and the methylene chloride extract washed with aqueous sodium carbonate (.1 N). The methylene chloride extract was dried over sodium sulfate, the solvent evaporated and the residue recrystallized from ethanol/ethyl acetate to yield, upon cooling, 3α-cholestanol m.p. 186° with satisfactory infrared and NMR spectra.

The term loweralkyl is used in this specification is to be interpreted as alkyl having 1–5 carbon atoms.

In accordance with ths above procedure but using the 3α-formate of androsterone in place of 3αcholestanol benzoate, there is obtained androsterone.

In accordance with the foregoing procedure but where in place of diethyl azodicarboxylate there is used dimethyl-, dipropyl- or dibutylazodicarboxylate the same result is obtained.

EXAMPLE II

Inversion Reaction on 5α-Androstane-3β-ol-17-one

Equimolar quantities of 5α-androstane-3β-ol-17-one (0.51 g; 0.002 mole), formic acid (0.092 g; 0.002 mole), diethyl azodicarboxylate (0.348 g; 0.002 mole) and 2 moles of triphenyl phosphine (0.524 g; 0.004 mole) were added to dry tetrahydrofuran (40 ml.). The reaction mixture was protected from moisture with a guard tube (calcium chloride) and stirred overnight at room temperature. The solvent was then removed under reduced pressure and the semi-solid passed through a Florisil column using hexane/benzene (65:35) as eluent, first 100 ml. of solvent mixture on evaporation gave 3α-formate of androsterone, 0.590 g. (approx. 92%),mp 181° (lit mp 181°–181°.5), with satisfactory infrared and NMR spectra. Direct comparison of this material with an authentic sample (mixture mp undepressed; superposable infrared spectra) showed identity.

In accordance with the foregoing procedure, but where, in place of formic acid, there is utilized acetic acid, propionic acid, benzoic acid, phenyl acetic acid, trifluoroacetic acid, phenol, or p-bromophenol, there are obtained the corresponding 3α-acetate, 3α-propionate, 3α-benzoate, 3α-phenyl acetate, 3α-trifluoroacetate, 3α-phenyl ether, and 3α-p-bromophenyl ether of androsterone.

In accordance with the foregoing procedure, but where in place of 5α-androstane-3β-ol-3-one, there is utilized 3β-hydroxy-5α-pregnane-11,20-dione, 21-acetoxy-3β-hydroxy-5α-pregnane-11,20-dione, there are obtained the corresponding 3α-esters and ethers of 3α-hydroxy-5α-pregnane-11,20-dione and 21-acetoxy-3-hydroxy-5α-pregnane-11,20-dione.

EXAMPLE III

3α-Trifluoroacetoxy-5α-Cholestane

Equimolar quantities of 3α-cholestanol (0.95 gms.), trifluoroacetic acid (0.57 gms.), triphenyl phosphine (1.31 gms.), and diethyl azodicarboxylate (0.87 gms.) were dissolved in dry tetrahydrofuran (50 ml.), stirred overnight at room temperature and solvent was removed under reduced pressure and the residue was passed through a short Florisil column using hexane as the eluent. Evaporation of the hexane fraction gave 2 gms. (82%) of 3α-trifluoro-acetoxy-5α-cholestane. Infrared and NMR spectra were satisfactory.

In accordance with the foregoing procedure but utilizing 21-acetoxy-3β-hydroxy-5α-pregnane-11,20-dione, and methyl cholate in place of 3β-cholestanol there is obtained the corresponding 21-acetoxy-3α-trifluoroacetoxy-5α-pregnane-11,20-dione and methyl-3β-trifluoroacetoxy-7α,12α-dihydroxy-cholanate.

EXAMPLE IV

3α-Cholestanol

Sodium carbonate (0.5 gms.) is dissolved in 1 ml. water and methanol (10 ml.), 3α-trifluoroacetoxy-3α-cholestane is added thereto and the mixture stirred at room temperature for 10 hours.

The mixture is extracted with methylene chloride and the organic layer washed with water and dried (anhydrous sodium sulfate). Removal of the solvent under reduced pressure yields 3α-cholestanol, identical with an authentic sample in melting point and spectra characteristics. The yield is essentially quantitative.

In accordance with the foregoing procedure but where in place of 3α-trifluoroacetoxy cholestanol there is utilized 21-acetoxy-3α-trifluoroacetoxy-5α-pregnane-11,20-dione or methyl-3β-trifluoroacetoxy-7α,12α-dihydroxy cholanate, there is obtained 21-acetoxy-3α-hydroxy-5α-pregnane-11,20-dione, and methyl 3α,12α-trihydroxy cholante.

EXAMPLE V

3α-p-Bromophenoxy-5α-Cholestane

3α-Cholestanol (3.88 g.), triphenyl phosphine (2.62 g.), p-bromophenol (1.73 g.), and diethyl azodicarboxylate (1.74 g.) in 120 ml. of tetrahydrofuran were allowed to react for 5 days at room temperature. After removal of the solvent under reduced pressure the residue was chromatographed over a short alumina column. The earlier fractions gave a crystalline solid which was further purified by recrystallization from methanol/ethyl acetate. The 3α-ether, mp 109°, was obtained in about 60% yield. The structure of this compound was verified by infrared, NMR and mass spectroscopy.

EXAMPLE VI
3α-Cholestanol

3α-p-Bromophenoxy-5α-cholestane is treated with boron trichloride in dry tetrahydrofuran. Work-up in the usual manner yields 3α-cholestanol.

I claim:

1. A method of inverting the stereochemical orientation of the 3-hydroxy moiety of 3-equatorial hydroxy steroids which comprises reacting said 3-equatorial hydroxy steroid selected from the group of compounds of the formula:

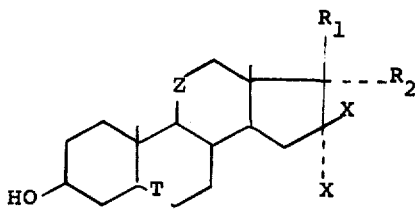

wherein
T is a carbon-carbon single bond or carbon-carbon double bond, provided that where
T is a carbon-carbon single bond, the hydrogen at 5 is 5α
Z is =$CH_2$ or C = O
X is fluorine, chlorine or bromine
$R_1$ is hydroxy, alkanoyl, $R_3O$—$CH_2.\overset{\cdot}{C}$=O
where $R_3$ is alkanoyl, aroyl, aralkanoyl, alkaroyl or hydroxy, lower alkyl, lower alkynyl, cyclo lower alkenyloxy, (lower alkoxy lower alkyl) lower alkoxy, (hydroxy lower alkyl) hydroxy lower alkyl, acetonidodihydroxy lower alkyl, $R_2$ is hydrogen, and $R_2$ and $R_1$ when taken together are = O, with triphenyl phosphone, diloweralkyl diazocarboxylate, and a member selected from the group consisting of alkyl, haloalkyl, polyhaloalkyl, aryl, alkaryl, and aralkyl carboxylic acids, phenols and halophenols,
whereby there is formed a compound selected from the group consisting of the corresponding 3α-steroid esters and 3α-steroid phenyl ethers.

2. A process according to claim 1 further comprising the step of reacting an ester produced in accordance with the process of claim 1 with a saponifying agent.

3. A process according to claim 2 wherein the saponifying agent is a strong base.

4. A process according to claim 3 wherein the base is an alkali metal hydroxide or alkali metal alkoxide in an alkanol.

5. A process according to claim 4 additionally comprising the step of isolating the thus produced 3α-hydroxy steroid therefrom.

6. A process according to claim 1 additionally comprising the step of reacting a phenyl ether produced in accordance with the process of claim 1 with boron trichloride or boron tribromide.

7. A process according to claim 1 wherein where the $R_3$ is alkanoyl, aroyl, aralkanoyl, or alkanoyl, the carboxylic acid is trifluoroacetic acid.

8. A process according to claim 7 additionally comprising the step of reacting the product of claim 7 with an alkaline metal carbonate in aqueous alkanol.

9. A process according to claim 1 which comprises sequentially reacting 21-acetoxy-3β-hydroxy-5α-pregnane-11,20-dione with:
 a. trifluoroacetic acid in the presence of triphenyl phosphine and diethyl azodicarboxylate, and
 b. sodium carbonate in aqueous methanol.

10. A process according to claim 5 which comprises the sequential steps of reacting 5α-androstane-3β-ol-17-one with:
 a. formic acid in the presence of triphenyl phosphine and diethyl diazocarboxylate and
 b. potassium hydroxide in aqueous methanol.

* * * * *